United States Patent
Tamaizumi et al.

(10) Patent No.: US 9,045,157 B2
(45) Date of Patent: Jun. 2, 2015

(54) ELECTRIC POWER STEERING APPARATUS

(71) Applicant: JTEKT CORPORATION, Osaka-shi, Osaka (JP)

(72) Inventors: Terutaka Tamaizumi, Okazaki (JP); Hirozumi Eki, Okazaki (JP); Masayuki Kita, Okazaki (JP); Isao Namikawa, Okazaki (JP)

(73) Assignee: JTEKT CORPORATION, Osaka (JP)

( * ) Notice: Subject to any disclaimer, the term of this patent is extended or adjusted under 35 U.S.C. 154(b) by 0 days.

(21) Appl. No.: 14/176,828

(22) Filed: Feb. 10, 2014

(65) Prior Publication Data

US 2014/0238769 A1    Aug. 28, 2014

(30) Foreign Application Priority Data

Feb. 27, 2013   (JP) .................................. 2013-037090

(51) Int. Cl.
  *B62D 5/04*   (2006.01)
  *B62D 6/04*   (2006.01)

(52) U.S. Cl.
  CPC ............... *B62D 5/0463* (2013.01); *B62D 6/04* (2013.01); *B62D 5/04* (2013.01)

(58) Field of Classification Search
  CPC ............................... B62D 5/04; B62D 5/0463
  USPC ......................... 180/443–446; 701/41–43, 23
  See application file for complete search history.

(56) References Cited

U.S. PATENT DOCUMENTS

| | | | | |
|---|---|---|---|---|
| 6,092,619 | A * | 7/2000 | Nishikawa et al. | 180/446 |
| 6,705,420 | B2 * | 3/2004 | Ono et al. | 180/407 |
| 7,826,950 | B2 | 11/2010 | Tamaizumi et al. | |
| 2008/0033613 | A1 | 2/2008 | Tamaizumi et al. | |
| 2013/0253767 | A1 * | 9/2013 | Lee et al. | 701/42 |

FOREIGN PATENT DOCUMENTS

| | | |
|---|---|---|
| JP | A-2006-131191 | 5/2006 |
| JP | B2-4453012 | 4/2010 |

* cited by examiner

*Primary Examiner* — Anne Marie Boehler
*Assistant Examiner* — Marlon Arce
(74) *Attorney, Agent, or Firm* — Oliff PLC

(57) ABSTRACT

A zero point change model executes banked road correspondence control when a vehicle travels on a banked road. By this control, a target turning angle when the total torque is zero can be changed from a neutral turning angle to a lower side of an inclined road surface. Thus, a steering angle of a steering wheel according to a banked road can be realized even if the driver does not apply steering torque during traveling on a banked road. Accordingly, the driver can obtain a suitable steering feeling when traveling on a banked road while achieving the target turning angle according to the total torque.

7 Claims, 7 Drawing Sheets

Case where yaw rate exceeds threshold (banked road)

Case where yaw rate is less than threshold (cant road)

ELECTRIC POWER STEERING APPARATUS

BACKGROUND OF THE INVENTION

The present invention relates to an electric power steering apparatus.

The electric power steering apparatus assists steering force through motor driving in order to realize an excellent steering feeling.

An electric power steering apparatus disclosed in Japanese Laid-Open Patent Publication No. 2006-131191 has an assist torque calculating unit which calculates assist torque based on a vehicle speed and steering torque. The assist torque calculating unit increases the assist torque as the steering torque becomes larger. The assist torque calculating unit also decreases the assist torque as the vehicle speed V becomes faster. A steering assist force according to this calculated assist torque is applied to the steering wheel through the motor.

An electric power steering apparatus disclosed in Japanese Patent No. 4453012 is provided with a first reference model for setting target steering torque on the basis of a steering angle, and a second reference model for setting a target turning angle of a steering system on the basis of steering torque. Operation of a motor is controlled on the basis of both reference models as ideal models. In such a case, torque feedback control is executed so as to cause actual steering torque to follow target steering torque through the first reference model. As a result, the steering torque can always be set at an optimal value. Moreover, turning angle feedback control is executed so as to cause an actual turning angle to follow a target turning angle through the second reference model. As a result, the actual turning angle according to the steering torque which is input torque can be realized.

Meanwhile, a banked road has a road surface inclined in a width direction thereof and is curved. When a vehicle without the second reference model travels on the banked road, the steered angular position of a steering wheel becomes a steered angular position according to the banked road even if a driver does not apply the steering torque. Thus, the driver does not need to turn the steering wheel greatly while traveling on the banked road.

However, the actual turning angle according to the steering torque is realized in a vehicle with the second reference model, so that the steering wheel is returned to a neutral position unless a driver applies the steering torque while traveling on the banked road. Accordingly, the driver needs to keep applying the steering torque to prevent the steering wheel from returning to the neutral position while traveling on the banked road. Therefore, a suitable steering feeling may not be obtained while traveling on the banked road.

SUMMARY OF THE INVENTION

An object of the present invention is to provide an electric power steering apparatus allowing a suitable steering feeling to be obtained even on a banked road in a configuration of making an actual turning angle follow a target turning angle according to input torque.

In order to solve the above problem, there is provided an electric power steering apparatus with the first embodiment of the present invention that includes a steering force provider configured to provide assist torque to a steering system, a first control device configured to provide assist torque to the steering system through the steering force provider according to steering torque applied to a steering shaft by operation of a steering wheel by a driver, a second control device configured to determine a target turning angle according to input torque that is at least either the assist torque or the steering torque, the second control device configured to control a turning angle of a vehicle at the target turning angle by providing assist torque to the steering system through the steering force provider, a traveling road detection device configured to detect the degree of inclination of a road surface on which the vehicle travels, and a changing device configured to execute banked road correspondence control through the second control device associated with an increase in the degree of inclination, the banked road correspondence control changing the target turning angle at a time when the input torque is zero from a neutral turning angle corresponding to a straight ahead direction of the vehicle to a lower side of the inclined road surface.

DETAILED DESCRIPTION OF THE PREFERRED EMBODIMENTS

First Embodiment

Hereinafter, the first embodiment embodying an electric power steering apparatus according to the present invention will be described with reference to FIGS. 1 to 8.

Figure 1:
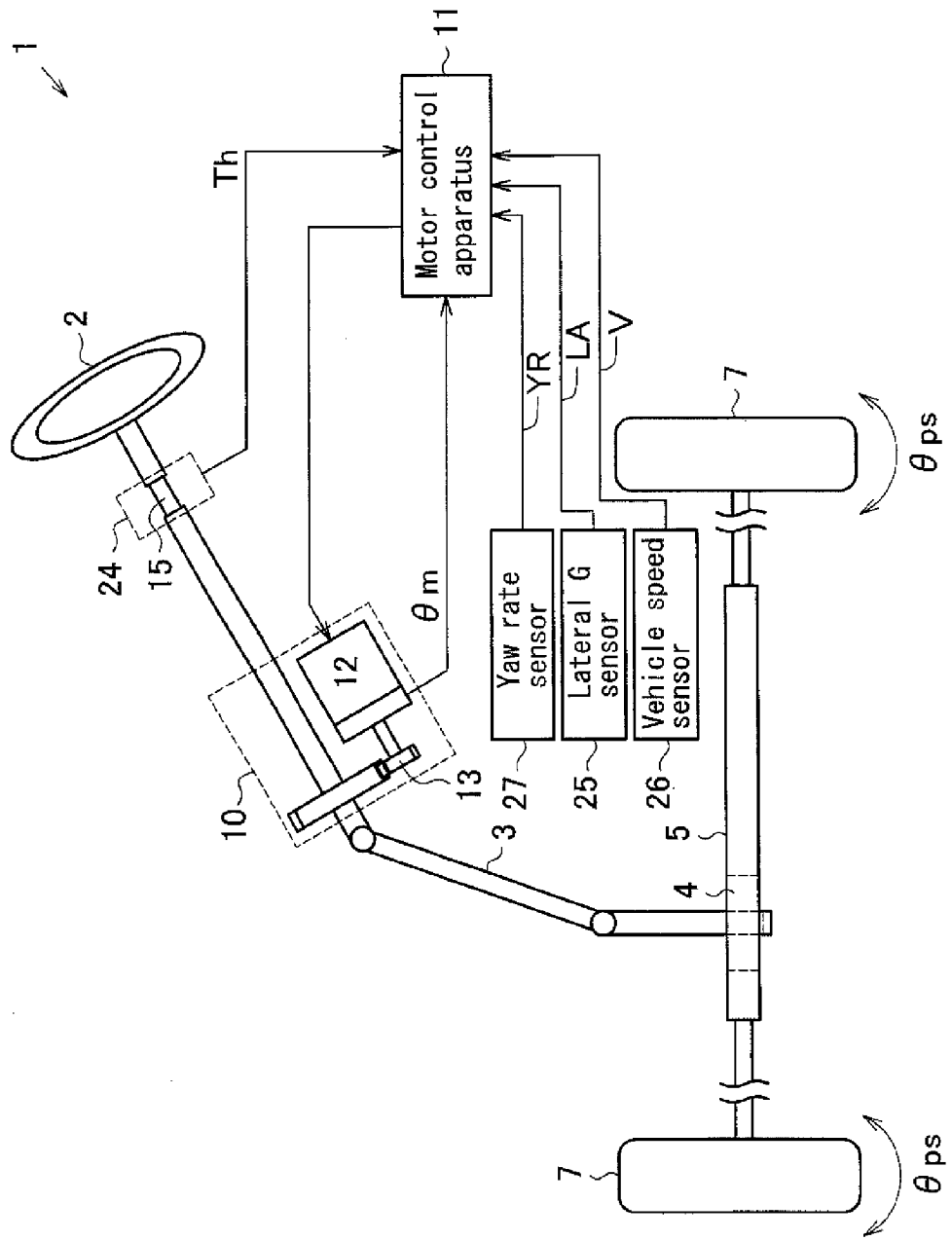
FIG. 1 is a block diagram showing an entire configuration of an electric power steering apparatus according to the first embodiment of the present invention.

As shown in FIG. 1, an electric power steering apparatus (EPS) 1 has a steering wheel 2 steered by a driver, a steering shaft 3 turned together with the steering wheel 2, and a rack shaft 5 coupled to the steering shaft 3 via a rack-and-pinion mechanism 4.

Upon operation of the steering wheel 2, the steering shaft 3 is rotated. The rotation of the steering shaft 3 is converted into reciprocating linear movement of the rack shaft 5 by the rack-and-pinion mechanism 4. By the reciprocating linear movement of the rack shaft 5, an actual turning angle θps of tires 7 is changed.

The EPS 1 also has an EPS actuator 10 as a steering force provider, and a motor control apparatus 11 controlling the movement of the EPS actuator 10. The EPS actuator 10 provides a steering system with an assist force for assisting steering operation. The EPS actuator 10 has a motor 12 serving as a driving source, and a speed reduction mechanism 13. As the motor 12, a brushless motor is employed.

The driving force of the motor 12 is transmitted to the steering shaft 3 after speed reduction through the speed reduction mechanism 13. Thus, the assist torque is provided to the steering system such as the steering wheel, the steering shaft 3, etc.

The motor control apparatus 11 is connected to a vehicle speed sensor 26, a lateral G sensor 25, a yaw rate sensor 27, and a torque sensor 24. The vehicle speed sensor 26 detects a vehicle speed V and outputs the detection result to the motor control apparatus 11. The lateral G sensor 25 detects a lateral acceleration LA acting in a vehicle width direction and outputs the detection result to the motor control apparatus 11. The yaw rate sensor 27 detects a yaw rate YR that is the rate of change of a rotation angle toward the turning direction of the vehicle, and then outputs the detection result to the motor control apparatus 11.

A torsion bar 15 is provided in the middle of the steering shaft 3. The torque sensor 24 detects a steering torque Th to be transmitted to the steering shaft 3 based on torsion of the torsion bar 15, and then outputs the detection result to the motor control apparatus 11.

Figure 2:
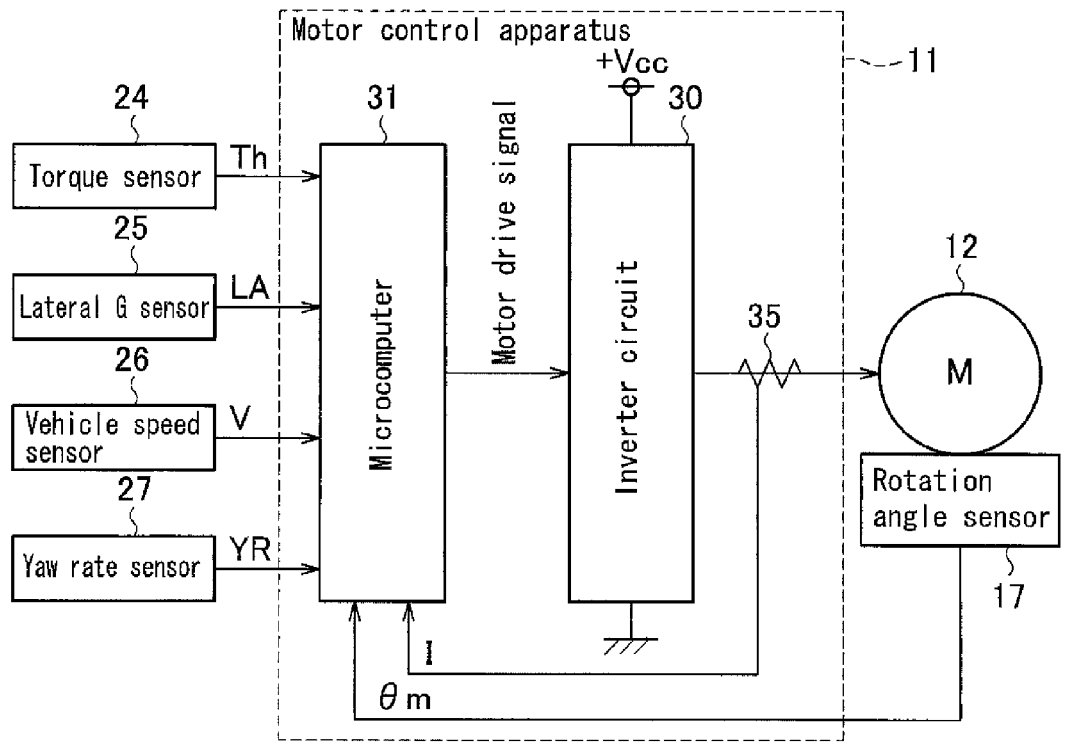
FIG. 2 is a block diagram showing a configuration of a motor control apparatus.

As shown in FIG. 2, the motor control apparatus 11 has a microcomputer 31 outputting a motor drive signal, and an inverter circuit 30 supplying the motor 12 with driving power based on the motor drive signal. A current sensor 35 for detecting an actual current value I is provided between the inverter circuit 30 and the motor 12. The motor 12 is provided with a rotation angle sensor 17 for detecting a motor rotation angle θm. The rotation angle sensor 17 outputs the detected motor rotation angle θm to the microcomputer 31.

Figure 3:
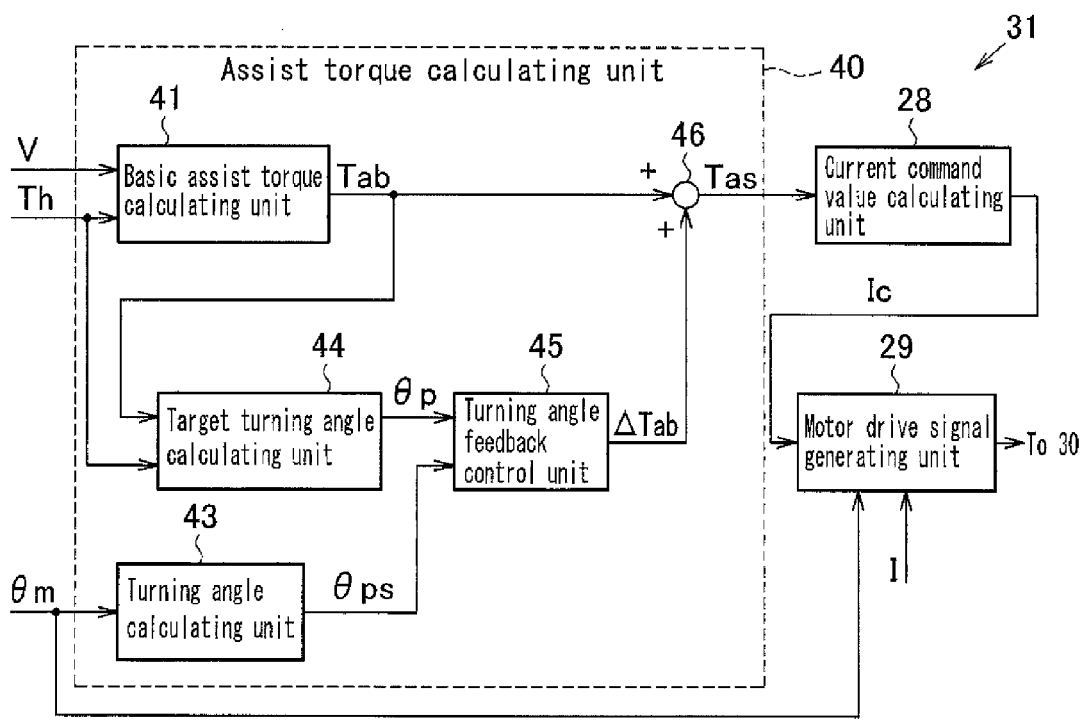
FIG. 3 is a block diagram showing a configuration of a microcomputer.

As shown in FIG. 3, the microcomputer 31 has an assist torque calculating unit 40, a current command value calculating unit 28, and a motor drive signal generating unit 29. Each control block in the microcomputer 31 is implemented by a computer program run by the microcomputer 31. The assist torque calculating unit 40 calculates an assist torque Tas to be generated in the motor 12 based on the steering torque Th and the vehicle speed V, and then outputs to the current command value calculating unit 28. The current command value calculating unit 28 calculates a current command value Ic corresponding to the assist torque Tas, and then outputs to the motor drive signal generating unit 29.

The motor drive signal generating unit 29 executes current feedback control to cause the actual current value I to follow the current command value Ic, and then generates a motor drive signal. The inverter circuit 30 drives the motor 12 based on the motor drive signal from the motor drive signal generating unit 29.

Figure 4:
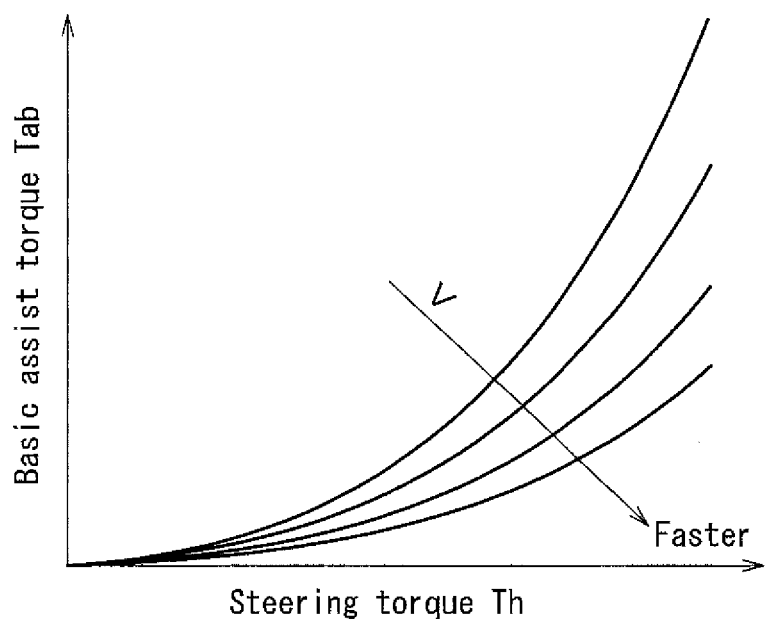
FIG. 4 is a graph showing the relationship between steering torque and basic assist torque.

The assist torque calculating unit 40 has a basic assist torque calculating unit 41, a target turning angle calculating unit 44, a turning angle feedback control unit 45, a turning angle calculating unit 43, and an adder 46. The basic assist torque calculating unit 41 calculates a basic assist torque Tab based on the steering torque Th detected by the torque sensor 24 and the vehicle speed V detected by the vehicle speed sensor 26, and then outputs to the target turning angle calculating unit 44 and the adder 46. Specifically, the basic assist torque calculating unit 41 increases the basic assist torque Tab as the steering torque Th becomes larger, and decreases the basic assist torque Tab as the vehicle speed V becomes faster, as shown in FIG. 4 in detail.

The target turning angle calculating unit 44 calculates a target turning angle θp based on the steering torque Th and the basic assist torque Tab, and then outputs to the turning angle feedback control unit 45. Further, the target turning angle θp is an ideal cutting angle (turning angle) of the tire depending on a total torque Tt obtained by summing the steering torque Th and the basic assist torque Tab. The turning angle calculating unit 43 calculates an actual turning angle θps based on the motor rotation angle θm detected through the rotation angle sensor 17, and then outputs to the turning angle feedback control unit 45.

The turning angle feedback control unit 45 outputs an assist torque correction value θTab by executing feedback control so as for the actual turning angle θps to follow the target turning angle θp. The adder 46 calculates an assist torque Tas by adding the assist torque correction value θTab to the basic assist torque Tab, and then outputs to the current command value calculating unit 28. In this manner, the magnitude of the assist torque Tas is controlled so as for the actual turning angle θps to be the target turning angle θp. Consequently, a more stable steering feeling can be obtained by suppressing reverse input vibration which is input from the steerable wheel to the steering system.

Next, control blocks of the target turning angle calculating unit 44 will be described with reference to FIG. 5.

Figure 5:
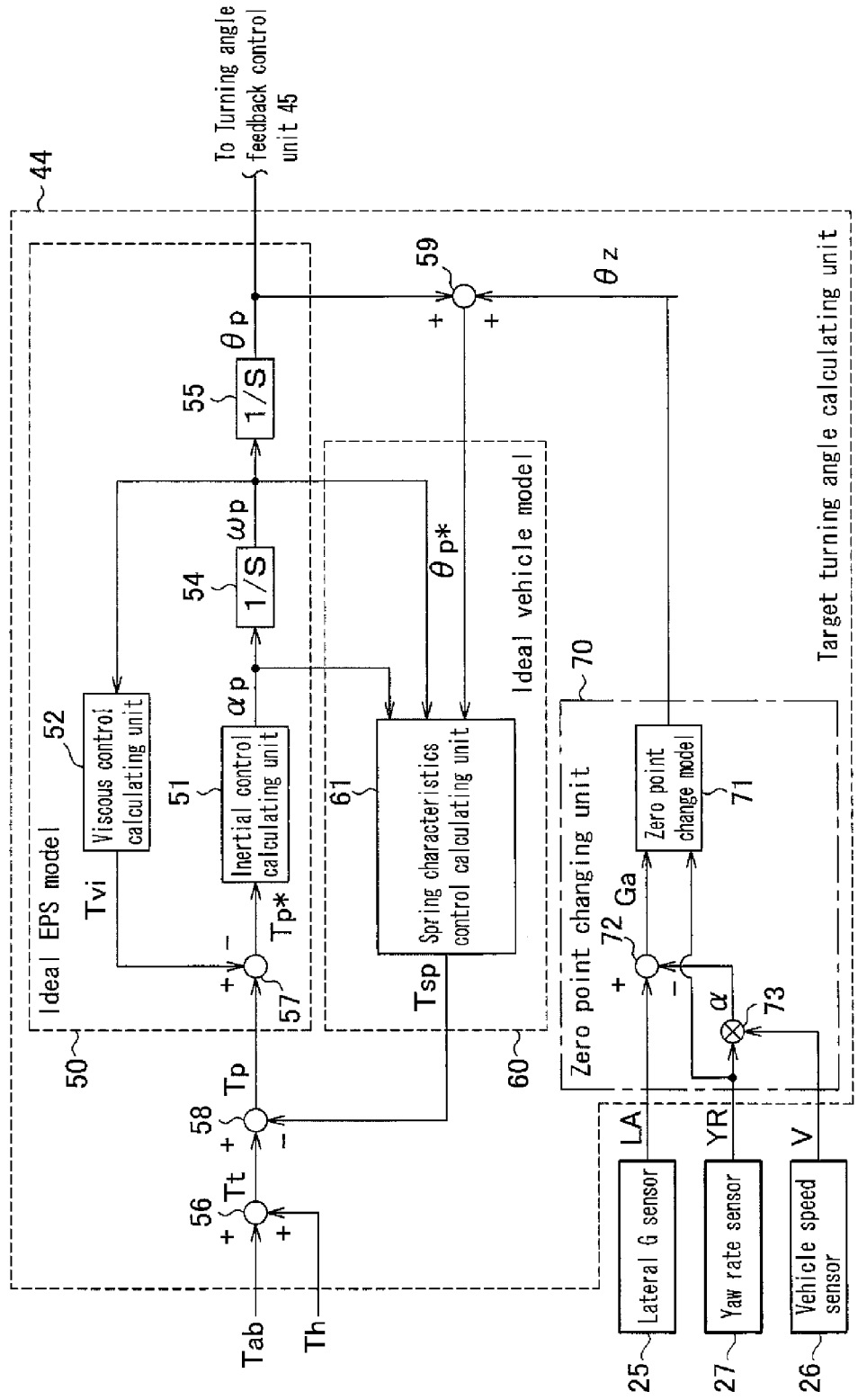
FIG. 5 is a block diagram showing a configuration of a target turning angle calculating unit.

As shown in FIG. 5, the target turning angle calculating unit 44 has an ideal EPS model 50, an ideal vehicle model 60, a zero point changing unit 70 as the changing device, adders 56, 59, and a subtractor 58. The adder 56 calculates a total torque Tt by adding the steering torque Th and the basic assist torque Tab, and outputs to the subtractor 58. The subtractor 58 calculates a subtraction value Tp by subtracting a spring component Tsp from the ideal vehicle model 60 from the total torque Tt, and outputs to the ideal EPS model 50. The ideal EPS model 50 is set depending on characteristics of elements which constitute the EPS 1 such as the steering shaft 3, the motor 12, etc. The ideal vehicle model 60 is set depending on specifications of a suspension and wheel alignment and on characteristics of the vehicle such as grip force of the steerable wheel. Here, the following equation holds between the total torque Tt and the target turning angle θp.

$$Tt = J\theta p'' + C\theta p' + K\theta p \tag{1}$$

More specifically, the total torque Tt is obtained by adding a value obtained by multiplying a second-order time differential value θp'' of the target turning angle θp by the moment of inertia J, a value obtained by multiplying a first-order time differential value θp' of the target turning angle θp by a viscosity coefficient C, and a value obtained by multiplying the target turning angle θp by a spring coefficient K. The ideal EPS model 50 and the ideal vehicle model 60 are configured to calculate the target turning angle θp from the total torque Tt based on the equation (1). The ideal EPS model 50 has an inertial control calculating unit 51 corresponding to an inertia term, a viscous control calculating unit 52 corresponding to a viscosity term, a subtractor 57, and a pair of integrators 54, 55. The ideal vehicle model 60 has a spring characteristics control calculating unit 61 corresponding to a spring term.

The subtractor 57 calculates a subtraction value Tp* by subtracting a viscous component Tvi from the viscous control calculating unit 52 from the subtraction value Tp, and outputs to the inertial control calculating unit 51. The inertial control calculating unit 51 calculates a target turning angle acceleration αp by dividing the subtraction value Tp* from the subtractor 57 by the moment of inertia J, and then outputs to the integrator 54 and the spring characteristics control calculating unit 61, respectively. The integrator 54 calculates a target turning angle speed ωp by integrating the target turning angle acceleration αp, and then outputs to the integrator 55, the spring characteristics control calculating unit 61, and the viscous control calculating unit 52, respectively.

The integrator 55 calculates the target turning angle θp by integrating the target turning angle speed ωp, and outputs to the turning angle feedback control unit 45 and the adder 59 (the spring characteristics control calculating unit 61), respectively. The viscous control calculating unit 52 calculates the viscous component Tvi based on the target turning angle speed ωp, and outputs to the subtractor 57. The spring characteristics control calculating unit 61 calculates the spring component Tsp based on the target turning angle acceleration αp, the target turning angle speed ωp, and the target turning angle θp, and outputs to the subtractor 58.

The zero point changing unit 70 has a zero point change model 71, a subtractor 72, and a multiplier 73. The zero point changing unit 70 sets the steering angle θs of the steering wheel 2 at a position corresponding to the banked road when the vehicle travels on the banked road. The road surface of the banked road increases in height toward the outside along a width direction orthogonal to the turning direction.

Figure 6:
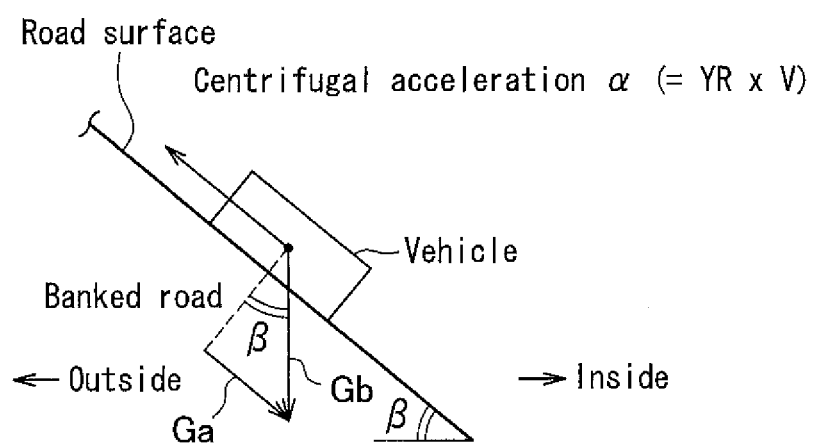
FIG. 6 is an explanatory diagram showing forces acting upon a vehicle.

As shown in FIG. 6, a gravity component Ga based on the road gradient is applied to the vehicle on the banked road along the width direction of the banked road. The gravity component Ga is expressed as "Gb Sin β" where the angle of inclination of the road surface is β and the gravitational acceleration is Gb. The zero point changing unit 70 calculates the gravity component Ga from the following equation.

$$\text{Gravity component } Ga = \text{Lateral acceleration } LA - \text{Vehicle speed } V \times \text{Yaw rate } YR \quad (2)$$

The equation (2) is derived from that the lateral acceleration LA is the value obtained by adding the centrifugal acceleration α and the gravity component Ga based on the road gradient. Further, the centrifugal acceleration a is expressed by vehicle speed V×yaw rate YR.

As shown in FIG. 5, the multiplier 73 calculates the centrifugal acceleration α by multiplying the vehicle speed V from the vehicle speed sensor 26 and, the yaw rate YR from the yaw rate sensor 27, and outputs to the subtractor 72. The subtractor 72 calculates the gravity component Ga by subtracting the centrifugal acceleration α from the multiplier 73 from the lateral acceleration LA from the lateral G sensor 25, and outputs to the zero point change model 71. The yaw rate YR detected by the yaw rate sensor 27 is also output to the zero point change model 71.

Figure 7A:
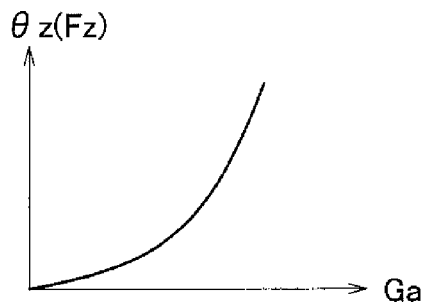
FIG. 7A is a graph showing the relationship between a gravity component associated with a road gradient and a zero drift angle (zero drift force) where a yaw rate exceeds a threshold.
Figure 7B:
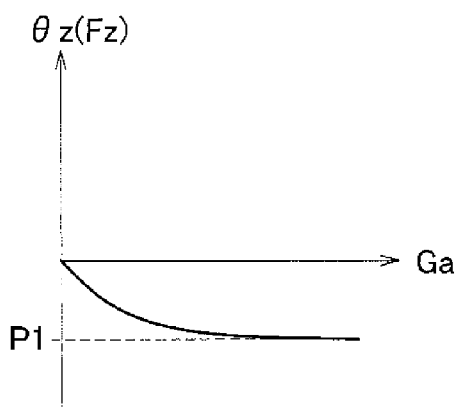
FIG. 7B is a graph showing the relationship between a gravity component associated with a road gradient and a zero drift angle (zero drift force) where a yaw rate is less than a threshold.

As shown in graphs of FIG. 7A and FIG. 7B, the zero point change model 71 determines a zero drift angle θz depending on the gravity component Ga, and outputs to the adder 59. The zero point change model 71 determines the zero drift angle θz by using the graph of FIG. 7A when the yaw rate YR exceeds a threshold. The zero point change model 71 determines the zero drift angle θz by using the graph of FIG. 7B when the yaw rate YR is less than the threshold.

The threshold is set for the purpose of distinguishing whether the vehicle is traveling on either road of the banked road or the canted road. The canted road has a road surface inclined in a width direction thereof and extends straight. More specifically, the threshold is set at a value smaller than the yaw rate YR when the vehicle is traveling on the banked road and larger than the yaw rate YR when the vehicle is traveling on the canted road.

The zero point change model 71 increases the zero drift angle θz with an increase in the gravity component Ga when the yaw rate YR exceeds a threshold as shown in FIG. 7A. Further, the zero point change model 71 converges the zero drift angle θz to a fixed negative value P1 with an increase in the gravity component Ga when the yaw rate YR is less than the threshold as shown in FIG. 7B. The adder 59 calculates a corrected target turning angle θp* by adding the target turning angle θp from the integrator 55 and the zero drift angle θz, and outputs to the spring characteristics control calculating unit 61.

Next, operation of the assist torque calculating unit 40 will be described with reference to FIGS. 7A to 8.

Where the vehicle travels on a road surface not inclined in the width direction of the road, the gravity component Ga based on the road gradient becomes zero and the zero drift angle θz also becomes zero. In this case, the configuration of the assist torque calculating unit 40 is the same as the conventional configuration not having the zero point changing unit 70. That is, as shown in actual line L1 of FIG. 8, the actual turning angle θps is feedback-controlled so as to follow the target turning angle θp when the total torque Tt applied to the steering shaft 3 is zero, and the steering angle θs of the steering wheel 2 is set at a neutral angle θc (0°). The steering angle θs of the steering wheel 2 at this moment corresponds to the actual turning angle θps. The actual turning angle θps becomes a neutral turning angle corresponding to the time of straight-ahead traveling of the vehicle when the steering angle θs of the steering wheel 2 is the neutral angle θc.

Where the vehicle travels on the banked road, the zero drift angle θz is also increased along with the increase of the gravity component Ga based on the road gradient according to the graph of FIG. 7A. In this case, the corrected target turning angle θp* to be input to the spring characteristics control calculating unit 61 is increased and the spring component Tsp to be output from the spring characteristics control calculating unit 61 is also increased. As a result, the subtraction value Tp to be output from the subtractor 58 to the ideal EPS model 50 is decreased. When the subtraction value Tp to be input to the ideal EPS model 50 is changed, the target turning angle θp to be output from the ideal EPS model 50 is also changed. Where the amount of increase in the spring component Tsp that increases together with the zero drift angle θz is a predetermined value A1 for example, the subtraction value Tp does not become zero even if the total torque Tt is zero. From this, the target turning angle θp becomes an angle θx corresponding to the predetermined value A1.

Figure 8:
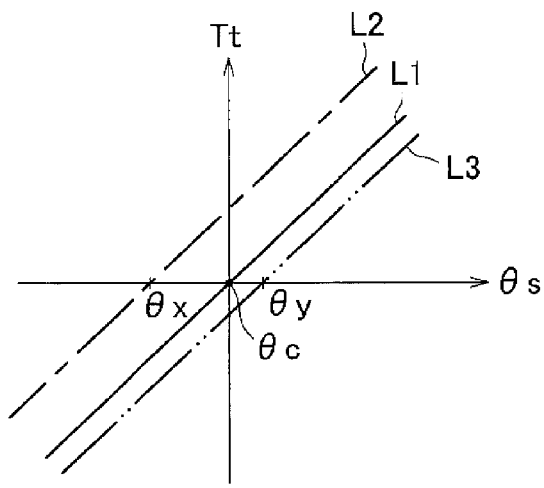
FIG. 8 is a graph showing the relationship between total torque and a steering angle.

That is, as shown in chain line L2 of FIG. 8, the steering angle θs of the steering wheel 2 is set at the angle θx when the total torque Tt applied to the steering shaft 3 is zero. The angle θx varies depending on the gravity component Ga based on the road gradient. This is because the banked road straight line L2 moves upward as the gravity component Ga becomes large. Therefore, the steering wheel 2 is held at the inner side of the banked road, that is, the lower side of the inclined road surface even in the state where the steering torque Th is not applied during traveling on the banked road. As a result, the vehicle can make a turn along the curve of the banked road even if a driver does not operate the steering wheel 2. The control of the zero point changing unit 70 at the time of traveling on the banked road is banked road correspondence control.

Where the vehicle travels on the canted road, the zero drift angle θz converges to a fixed value P1 against the increase in the gravity component Ga based on the road gradient according to the graph of FIG. 7B. In this case, the corrected target turning angle θp* to be input to the spring characteristics control calculating unit 61 is decreased, and the spring component Tsp to be output from the spring characteristics control calculating unit 61 is also decreased. As a result, the subtraction value Tp to be output to the ideal EPS model 50 through the subtractor 58 is increased. Here, the subtraction value Tp does not become zero even if the total torque Tt is zero where the amount of decrease in the spring component Tsp associated with the decrease in the zero drift angle θz is a predetermined value A2. From this, the target turning angle θp becomes an angle θy corresponding to the predetermined value A2.

That is, as shown in double chain line L3 of FIG. 8, the steering angle θs of the steering wheel 2 is set at the angle θy when the total torque Tt applied to the steering shaft 3 is zero. Both angles θx and θy differ in positive and negative signs across the neutral angle θc (0°). Therefore, the steering wheel 2 is held at the higher side of the inclined road surface of the canted road even in the state where the steering torque Th is not applied during traveling on the canted road. As a result, the vehicle can travel straight ahead without turning depending on the inclined surface of the canted road even if a driver does not operate the steering wheel 2. The control of the zero point changing unit 70 at the time of traveling on the canted road is canted road correspondence control. Further, the basic assist torque calculating unit 41 corresponds to the first control device, and the target turning angle calculating unit 44 and the turning angle feedback control unit 45 correspond to the second control device. The total torque Tt corresponds to the input torque.

According to the first embodiment described above, the following advantageous effects can be performed.

(1) The zero point change model 71 executes the banked road correspondence control when the vehicle travels on the banked road. By this control, the target turning angle θp when the total torque Tt is zero can be changed from the neutral turning angle to the lower side of the inclined road surface. Thus, the steering angle θs of the steering wheel 2 according to the banked road can be realized even if a driver does not apply the steering torque Th during traveling on the banked road. Accordingly, the driver can obtain a suitable steering feeling when traveling on the banked road also in the configuration that achieves the target turning angle θp according to the total torque Tt.

(2) The road surface of the canted road is inclined similar to the banked road. On the other hand, the canted road extends straight in contrast to the banked road. Thus, the yaw rate YR of the vehicle at the time of traveling on the banked road is larger than that at the time of traveling on the canted road. Focusing on the difference in the yaw rate YR, the banked road correspondence control is executed when the yaw rate YR exceeds the threshold, whereas the canted road correspondence control is executed when the yaw rate YR is less than the threshold.

By the canted road correspondence control, the target turning angle θp when the total torque Tt is zero can be changed from the neutral turning angle to the higher side of the inclined road surface associated with an increase in the angle of inclination β. Thus, the vehicle can be moved straight ahead along the canted road even if the driver does not apply the steering torque Th during traveling on the canted road. Accordingly, a driver can obtain a suitable steering feeling when traveling on the canted road also in the configuration that allows for the execution of the banked road correspondence control.

(3) The target turning angle θp when the total torque Tt is zero can be changed by an angle according to the zero drift angle θz from the neutral turning angle by adding the zero drift angle θz to the target turning angle θp. Since the units of the zero drift angle θz and the target turning angle θp are the same, a designer can adjust the zero drift angle θz with respect to the gravity component Ga based on the road gradient, and intuitively set the target turning angle θp corresponding to the banked road. Accordingly, the target turning angle θp can be set readily.

(4) The gravity component Ga is obtained by using the detection results of the yaw rate sensor 27, the vehicle speed sensor 26, and the lateral G sensor 25 mounted in a general vehicle. The gravity component Ga becomes larger according to the angle of inclination β of the banked road when the vehicle is located on the inclined road surface of the banked road. In this case, whether the vehicle travels on the inclined road surface such as the banked road or travels on a flat non-inclined road surface can be detected by the gravity component Ga without adding a new configuration to the vehicle.

Second Embodiment

Hereinafter, the second embodiment embodying the electric power steering apparatus according to the present invention will be described with reference to FIG. 9. The connecting position of the zero point change model in the second embodiment differs from that of the first embodiment. Hereinafter, different points from the first embodiment will be described mainly.

Figure 9:
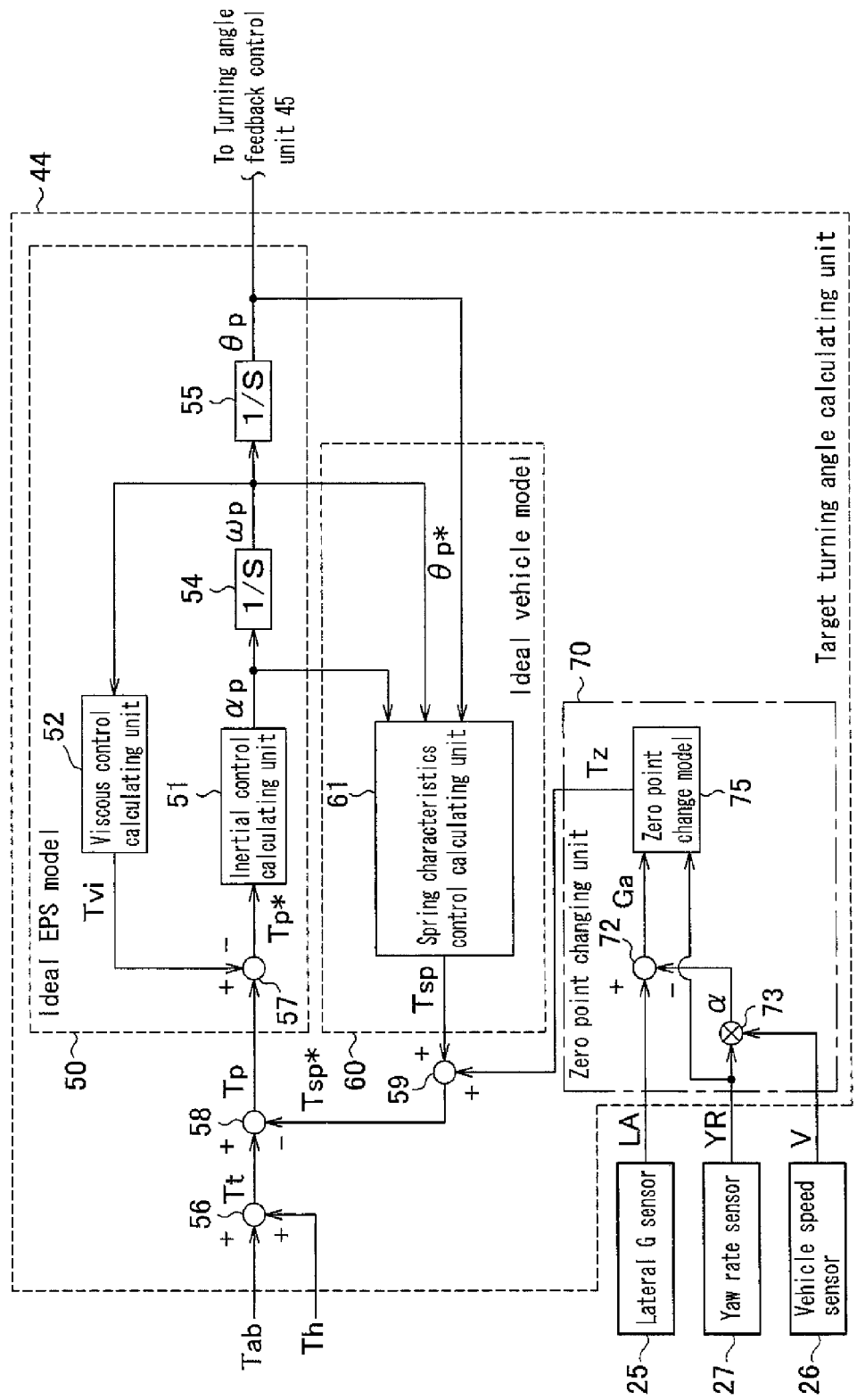
FIG. 9 is a block diagram showing a configuration of a target turning angle calculating unit according to the second embodiment of the present invention.

As shown in FIG. 9, the adder 59 is provided between the spring characteristics control calculating unit 61 and the subtractor 58. A zero point change model 75 uses the graphs of FIG. 7A and FIG. 7B to determine a zero drift force Fz (the unit is force) depending on the gravity component Ga, in the same manner as the first embodiment. The gradients of the graphs of FIG. 7A and FIG. 7B are the same as the first embodiment. The zero point change model 75 converts the zero drift force Fz into torque, calculates the zero drift torque Tz, and outputs to the adder 59. The adder 59 adds the spring component Tsp and the zero drift torque Tz, calculates a corrected spring component Tsp*, and outputs to the subtractor 58.

The value of the corrected spring component Tsp* to be subtracted from the total torque Tt varies depending on the road such as the banked road, the canted road, etc., also in the second embodiment. Therefore, the steering angles θs of the steering wheel 2 (the actual turning angles θps) with respect to the total torques Tt suitable for the banked road and the canted road can be realized.

According to the second embodiment described above, the following advantageous effect can be performed in addition to the advantageous effects of (1) to (4) of the first embodiment.

(5) The target turning angle θp when the total torque Tt is zero can be changed by an angle according to the zero drift torque Tz from the neutral turning angle by adding the zero drift torque Tz to the spring component Tsp. The zero drift torque Tz is not input to the ideal vehicle model 60 in the second embodiment. Thus, phase lag due to that the zero drift torque Tz output from the zero point change model 75 goes through the ideal vehicle model 60 can be suppressed. Accordingly, the relationship between the total torque Tt and the target turning angle θp can be brought into a state suitable for the banked road or the canted road more quickly.

Further, the foregoing embodiments may be modified as follows.

Either one of the graphs of FIG. 7A and FIG. 7B is used based on whether the yaw rate YR exceeds the threshold in both of the foregoing embodiments. However, a graph having three axes of the zero drift angle θz (the zero drift force Fz), the gravity component Ga based on the road gradient, and the yaw rate YR may be used.

The zero point change models 71 and 75 may determine the zero drift angle θz (the zero drift force Fz) without taking the yaw rate YR into consideration. In this case, the graph of FIG. 7A corresponding to the banked road is used.

The target turning angle calculating unit 44 calculates the target turning angle θp based on the total torque Tt in the foregoing embodiments. However, the target turning angle θp may be calculated based on only the steering torque Th or only the basic assist torque Tab.

The subtractor 72 and the multiplier 73 serving as the traveling road detection device calculates the gravity component Ga corresponding to the angle of inclination 3 in the foregoing embodiments. However, an inclination angle sensor may be provided to the vehicle and the angle of inclination β may be detected by the inclination angle sensor if the degree of inclination of the road surface can be detected. In this case, the calculation of the gravity component Ga becomes unnecessary.

The invention claimed is:

1. An electric power steering apparatus comprising:
   a steering force provider configured to provide assist torque to a steering system;
   a first control device configured to provide assist torque to the steering system through the steering force provider according to steering torque applied to a steering shaft by operation of a steering wheel by a driver;
   a second control device configured to determine a target turning angle according to input torque that is at least either the assist torque or the steering torque, the second control device configured to control a turning angle of a vehicle at the target turning angle by providing assist torque to the steering system through the steering force provider;
   a traveling road detection device configured to detect the degree of inclination of a road surface on which the vehicle travels; and
   a changing device configured to execute banked road correspondence control through the second control device associated with an increase in the degree of inclination, the banked road correspondence control changing the target turning angle at a time when the input torque is zero from a neutral turning angle corresponding to a straight ahead direction of the vehicle to a lower side of the inclined road surface.

2. The electric power steering apparatus according to claim 1, wherein
   the changing device determines that the vehicle is traveling on a banked road if a yaw rate of the vehicle exceeds a threshold and executes the banked road correspondence control; and
   the changing device determines that the vehicle is traveling on a canted road if the yaw rate is less than the threshold and executes canted road correspondence control through the second control device associated with an increase in the degree of inclination, wherein the canted road correspondence control changes the target turning angle when the input torque is zero from the neutral turning angle to a higher side of the inclined road surface.

3. The electric power steering apparatus according to claim 2, wherein, under the banked road correspondence control, the target turning angle when the input torque is zero is controlled to be increased with an increase in a gravity component acting upon the vehicle based on a road surface gradient.

4. The electric power steering apparatus according to claim 2, wherein, under the canted road correspondence control, the target turning angle when the input torque is zero is controlled to converge to a predetermined value with an increase in a gravity component acting upon the vehicle based on a road surface gradient.

5. The electric power steering apparatus according to claim 1, wherein
   the second control device comprises an ideal EPS model, an ideal vehicle model, and a subtractor;
   the subtractor outputs to the ideal EPS model a subtraction value obtained by subtracting a spring component from the ideal vehicle model from the input torque;
   the ideal EPS model calculates a target turning angle acceleration, a target turning angle speed, and the target turning angle based on the subtraction value;
   the ideal vehicle model calculates the spring component based on the target turning angle, the target turning angle speed, and the target turning angle acceleration from the ideal EPS model, and outputs to the subtractor; and
   the changing device determines a zero drift angle depending on an increase in the degree of inclination and adjusts the target turning angle with respect to the input torque by adding the zero drift angle to the target turning angle from the ideal EPS model.

6. The electric power steering apparatus according to claim 1, wherein
   the second control device comprises an ideal EPS model, an ideal vehicle model, and a subtractor;
   the subtractor outputs to the ideal EPS model a subtraction value obtained by subtracting a spring component from the ideal vehicle model from the input torque;
   the ideal EPS model calculates a target turning angle acceleration, a target turning angle speed, and the target turning angle based on the subtraction value;
   the ideal vehicle model calculates the spring component based on the target turning angle, the target turning angle speed, and the target turning angle acceleration from the ideal EPS model, and outputs to the subtractor; and
   the changing device determines a zero drift torque depending on the degree of inclination and adjusts the target turning angle with respect to the input torque by adding the zero drift torque to the spring component from the ideal vehicle model.

7. The electric power steering apparatus according to claim 1, wherein
   the traveling road detection device calculates a gravity component acting upon the vehicle by subtracting a centrifugal force having been obtained by multiplying a yaw rate and a vehicle speed, from a lateral acceleration acting in a width direction of the vehicle, and
   the traveling road detection device detects the degree of inclination based on the gravity component.

* * * * *